United States Patent [19]

Yoshida et al.

[11] Patent Number: 5,177,622
[45] Date of Patent: Jan. 5, 1993

[54] METHOD AND APPARATUS FOR DETECTING RUN LENGTH OF TWO SUCCESSIVE PIXELS AND SUBJECTING RUN LENGTH TO UNIVERSAL CODING

[75] Inventors: Shigeru Yoshida, Ebina; Yasuhiko Nakano, Atsugi, both of Japan

[73] Assignee: Fujitsu Limited, Kawasaki, Japan

[21] Appl. No.: 558,445

[22] Filed: Jul. 27, 1990

[30] Foreign Application Priority Data

Jul. 27, 1989 [JP] Japan .................................. 1-194619

[51] Int. Cl.⁵ ............................................. H04N 1/417
[52] U.S. Cl. ..................................... 358/429; 358/426
[58] Field of Search ...................... 358/426, 261.3, 427, 358/262.1, 428–430, 432, 433, 261.1, 261.2, 261.4; 341/51, 56, 59

[56] References Cited

U.S. PATENT DOCUMENTS

4,623,325 12/1986 Usubuchi .

FOREIGN PATENT DOCUMENTS

1440378 6/1976 United Kingdom .............. 358/261.2

OTHER PUBLICATIONS

Usubuchi et al., "Adaptive Predictive Coding for Newspaper Facsimile", Proceedings of the IEEE, vol. 68, No. 7, Jul. 1980.

Seiji Munakata, "Ziv-Lempel Data Compression Algorithms", Information Processing, vol. 26, No. 1, 1985, No translation.

T. C. Bell, "Better OPM/L Text Compression", IEEE Transactions on Communications, vol. COM-34, No. 12, Dec. 1986.

T. A. Welch, "A Technique for High-Performance Data Compression", Computer, Jun. 1984 are referred to in the specification. These references fail to show the subject matter of the present invention.

The applicants are also aware of Ishii et al., "Highly Efficient Data Compression Method for Newspaper Image Data", Fujitsu Sci. Tech. J., 18, 2, p. 199-225, Jun. 1982.

Langdon, Jr. et al., "Compression of Black-White Images with Arithmetic Coding", IEEE Transactions on Communications, vol. COM-29, No. 6, Jun. 1981 which relate to the background art.

Primary Examiner—Edward L. Coles, Sr.
Assistant Examiner—Jerome Grant, II
Attorney, Agent, or Firm—Staas & Halsey

[57] ABSTRACT

A halftone image data compression apparatus includes a first part for detecting a continuous state of pattern data of two successive pixels on a line of a halftone image for N adjacent lines of the halftone image. A second part is coupled to the first part for detecting a run length of the continuous state detected in the first part along a direction of the lines, and a third part is coupled to the first and second parts for subjecting to a universal coding a time-sequential data which is in predetermined processing units. Each predetermined processing unit is made up of one run length which is detected by the second part and corresponding pattern data which are received from the first part while the continuous state is detected for the one run length.

16 Claims, 11 Drawing Sheets

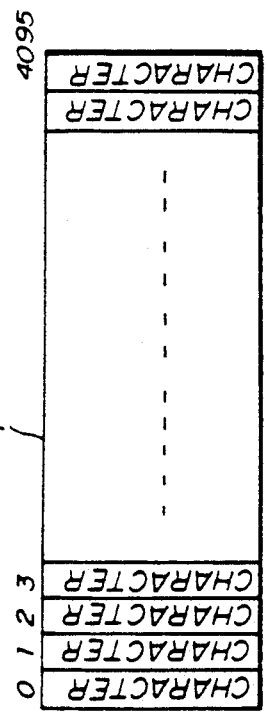
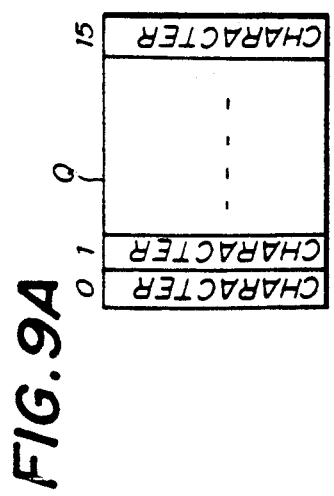
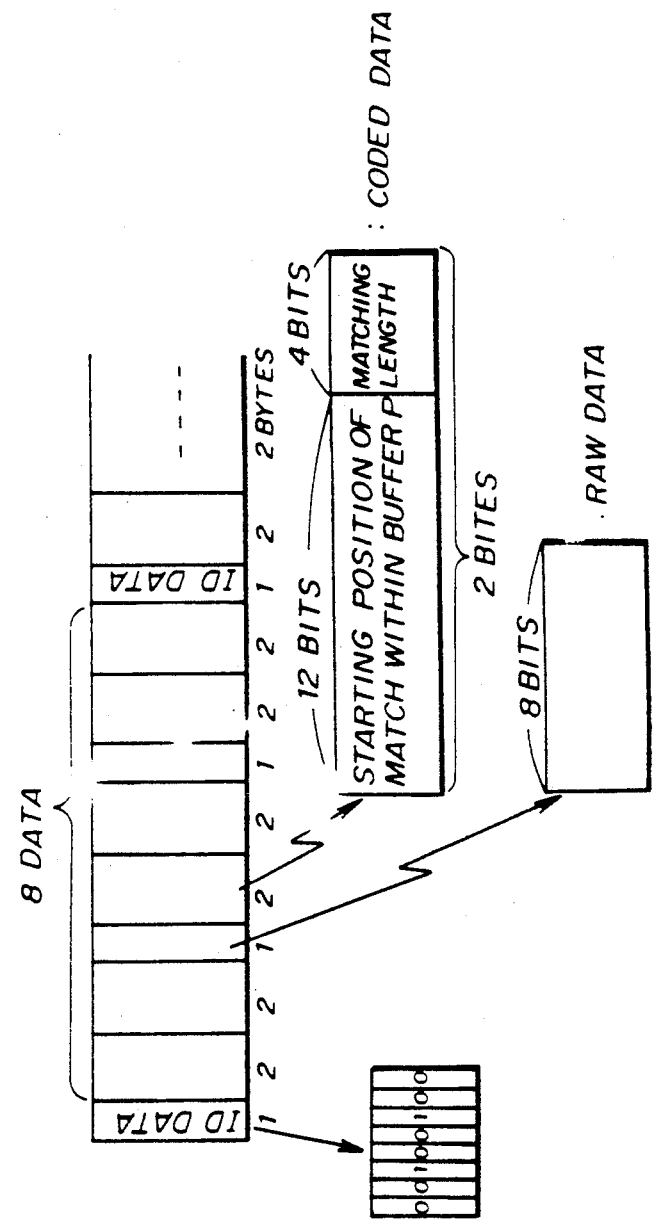

FIG.13

| INPUT SYMBOLS | a | b | a | b | c | b | a | b | a | b | a | a | a | a | a |
|---|---|---|---|---|---|---|---|---|---|---|---|---|---|---|---|
| OUTPUT CODES | 1 | 2 | 4 | | 3 | | 5 | | 7 | | | 11 | | | |
| | | | | | | | | | | | | | | | |
| NEW STRING ADDED TO TABLE | 4 | | 5 | 6 | | 7 | 8 | | 9 | 10 | | 11 | 12 | | |

Output codes lower row: 5, 7, 9, 10, 11, 12
New strings: 4, 5, 6, 7, 8, 9, 10, 11, 12

FIG.14

| STRING TABLE | | ALTERNATE TABLE | |
|---|---|---|---|
| a | 1 | a | 1 |
| b | 2 | b | 2 |
| c | 3 | c | 3 |
| ab | 4 | 1b | 4 |
| ba | 5 | 2a | 5 |
| abc | 6 | 4c | 6 |
| cb | 7 | 3b | 7 |
| bab | 8 | 5b | 8 |
| baba | 9 | 8a | 9 |
| aa | 10 | 1a | 10 |
| aa | 11 | 10a | 11 |
| aaqa | 12 | 11a | 12 |

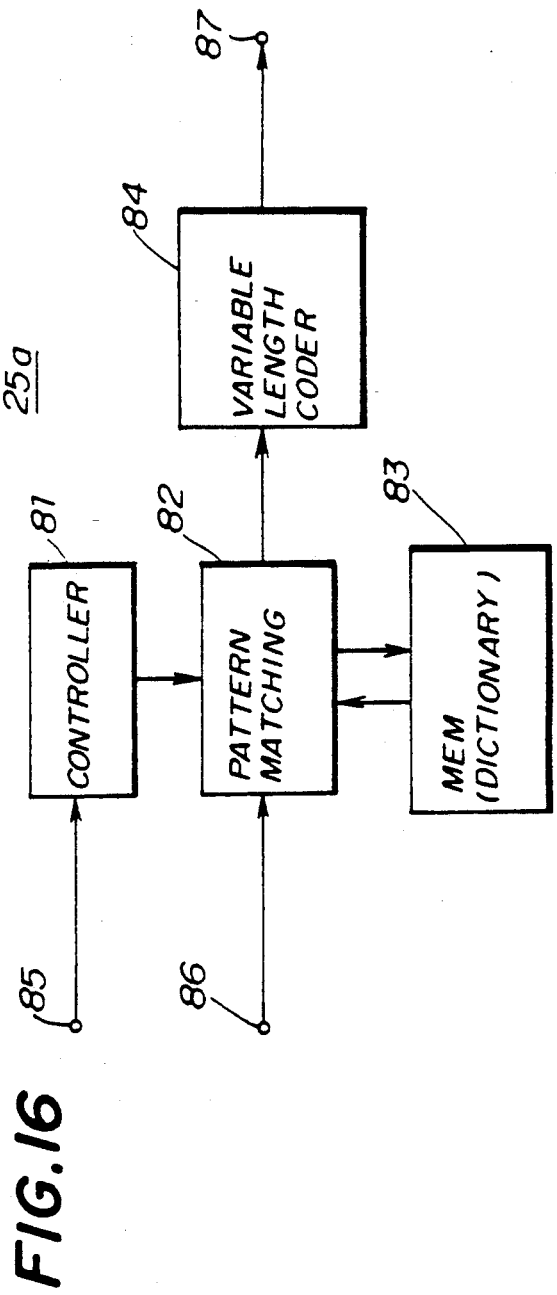

METHOD AND APPARATUS FOR DETECTING RUN LENGTH OF TWO SUCCESSIVE PIXELS AND SUBJECTING RUN LENGTH TO UNIVERSAL CODING

BACKGROUND OF THE INVENTION

The present invention generally relates to methods and apparatuses for compressing halftone image data, and more particularly to a method and an apparatus for compressing halftone image data with a high data compression ratio using a circuit having a small scale regardless of a period of screen dots in the halftone.

Recently, with the development of office automation systems, photographic images are processed in addition to character images as document information. Normally, the document is described in two levels of tone, that is, black and white. On the other hand, a photographic image is described by a density of black pixels such as the halftone which is described by the tone reproduction method by density of each element. For this reason, the data quantity of the photographic image is considerably large when compared to the data quantity of the character image. The data quantity of the photographic image is ten-odd times to several tens of times the data quantity of the character image. Accordingly, in order to efficiently process the photographic image when storing or transmitting the document, it is essential to use an efficient data compression system so as to reduce the data quantity.

A known predictive coding may be used to compress the halftone image data. As shown in FIG.1, reference pixels indicated by circular marks are taken around an object pixel indicated by a black circular mark and reference pixels indicated by rectangular marks are also taken at locations separated by one period of the screen dots from the object pixel. In FIG.1, PH denotes the period of the screen dots taken along a horizontal direction and PV denotes the period of the screen dots taken along a vertical direction. Whether the object pixel is black or white is predicted from the black or white state of each of the reference pixels, and a prediction error is coded.

However, in the case of a facsimile machine or the like which reads the document on a scanner and compresses the image data, there are various kinds of halftones and the period of the screen dots is in most cases not known beforehand. For this reason, an adaptive predictive coding is conventionally employed by providing a plurality of predictors which use reference pixels in correspondence with periods of various screen dots, selecting one of the predictors which have a smallest number of prediction errors, and carrying out the coding using the selected predictor.

In other words, two predictors having mutually different screen dot periods are provided as shown in FIG.2, for example. A conventional data compression system shown in FIG.2 includes a line memory 1, predictors 2 and 3 having mutually different screen dot periods, exclusive-OR circuits 4 and 5, a multiplexer 6, a coder 7, counters 8 and 9, and a comparator 10 which are connected as shown.

An input halftone image signal is supplied to the line memory 1 and stored therein. This input halftone image signal is also supplied to the exclusive-OR circuits 4 and 5. The predictors 2 and 3 respectively predict the black or white state of the input halftone image signal which is read out from the line memory 1 for each pixel, and the exclusive-OR circuits 4 and 5 respectively obtain prediction errors of the predictors 2 and 3. The prediction errors are supplied to the multiplexer 6.

On the other hand, the counters 8 and 9 respectively count the number of prediction errors made by the predictors 2 and 3 during a predetermined interval of the input halftone image signal. The comparator 10 compares the numbers of prediction errors counted in the counters 8 and 9 and outputs a selection signal which indicates the counter which has the smaller count, that is, the predictor with the smaller number of prediction errors. The multiplexer 6 selectively passes the prediction error which originates from the predictor with the smaller number of prediction errors in response to the selection signal during a next predetermined interval of the input halftone image signal. The coder 7 codes the prediction error output from the multiplexer 6, and a coded signal is output via an output terminal 12.

For example, the above described adaptive predictive coding is proposed in Usubuchi et al., "Adaptive Predictive Coding for Newspaper Facsimile", Proceedings of the IEEE, Vol.68, No.7, July 1980.

However, according to the conventional data compression system for compressing halftone images, the predictors are designed by predicting the statistical nature of the halftone images. For this reason, although an effective data compression can be made when the screen dot period of the predictor used matches the screen dot period of the actual halftone image, there is a problem in that the efficiency of the data compression considerably deteriorates when the screen dot period of the predictor used does not match the screen dot period of the actual halftone image. Of course, the deterioration of the efficiency of the data compression caused by the unmatched screen dot periods of the predictor and the actual halftone image is improved to a certain extent by the use of the adaptive predictive coding. But on the other hand, in order to greatly improve the deterioration of the efficiency of the data compression, it is necessary to increase the number of predictors and the scale of the circuit consequently becomes large thereby introducing a different problem.

On the other hand, universal coding schemes have been proposed. However, the universal coding focuses only on one-dimensional strings and there is still room for improving the data compression ratio.

SUMMARY OF THE INVENTION

Accordingly, it is a general object of the present invention to provide a novel and useful method and apparatus for compressing halftone image data, in which the problems described above are eliminated.

Another and more specific object of the present invention is to provide a halftone image data compression apparatus comprising first means for detecting a continuous state of pattern data of two successive pixels on a line of a halftone image for N adjacent lines of the halftone image, second means coupled to the first means for detecting a run length of the continuous state detected in the first means along a direction of the lines, and third means coupled to the first and second means for subjecting to a universal coding a time-sequential data which is in predetermined processing units, where each of the predetermined processing units are made up of one run length which is detected by the second means and corresponding pattern data which are received from the first means while the continuous state is detected for the one run length. According to the halftone image data compression apparatus of the present invention, it is possible to considerably improve the data compression ratio of the halftone image.

Still another object of the present invention is to provide a method of compressing halftone image data comprising a first step of detecting a continuous state of pattern data of two successive pixels on a line of a halftone image for N adjacent lines of the halftone image, a second step of detecting a run length of the continuous state which is detected in the first step along a direction of the lines, and a third step of subjecting to a universal coding a time-sequential data which is in predetermined processing units, where each of the predetermined processing units are made up of one run length which is detected in the second step and corresponding pattern data which are received while the continuous state is detected for the one run length. According to the method of the present invention, it is possible to considerably improve the data compression ratio of the halftone image.

Other objects and further features of the present invention will be apparent from the following detailed description when read in conjunction with the accompanying drawings.

BRIEF DESCRIPTION OF THE DRAWINGS

FIGS.9A, 9B and 10 are diagrams for explaining an LZSS coding;

FIG.13 is a diagram for explaining the coding in conformance with the LZW coding;

FIG.14 is a diagram for explaining a dictionary which is used for the LZW coding;

FIG.15 is a diagram for explaining the decoding in conformance with the LZW coding; and FIG.16 is a system block diagram showing an embodiment of a universal coding part shown in FIG.4.

DESCRIPTION OF THE PREFERRED EMBODIMENTS

Figure 1:
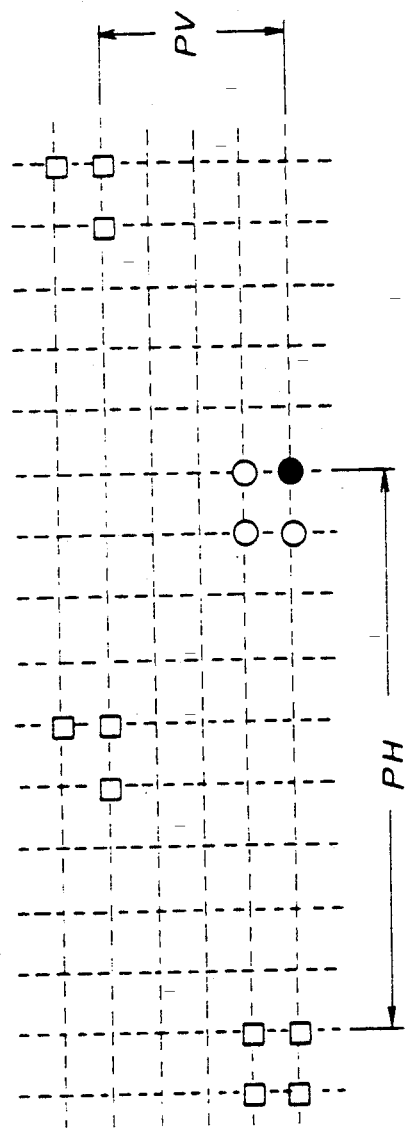
FIG.1 is a diagram for explaining a conventional predictive coding.
Figure 2:
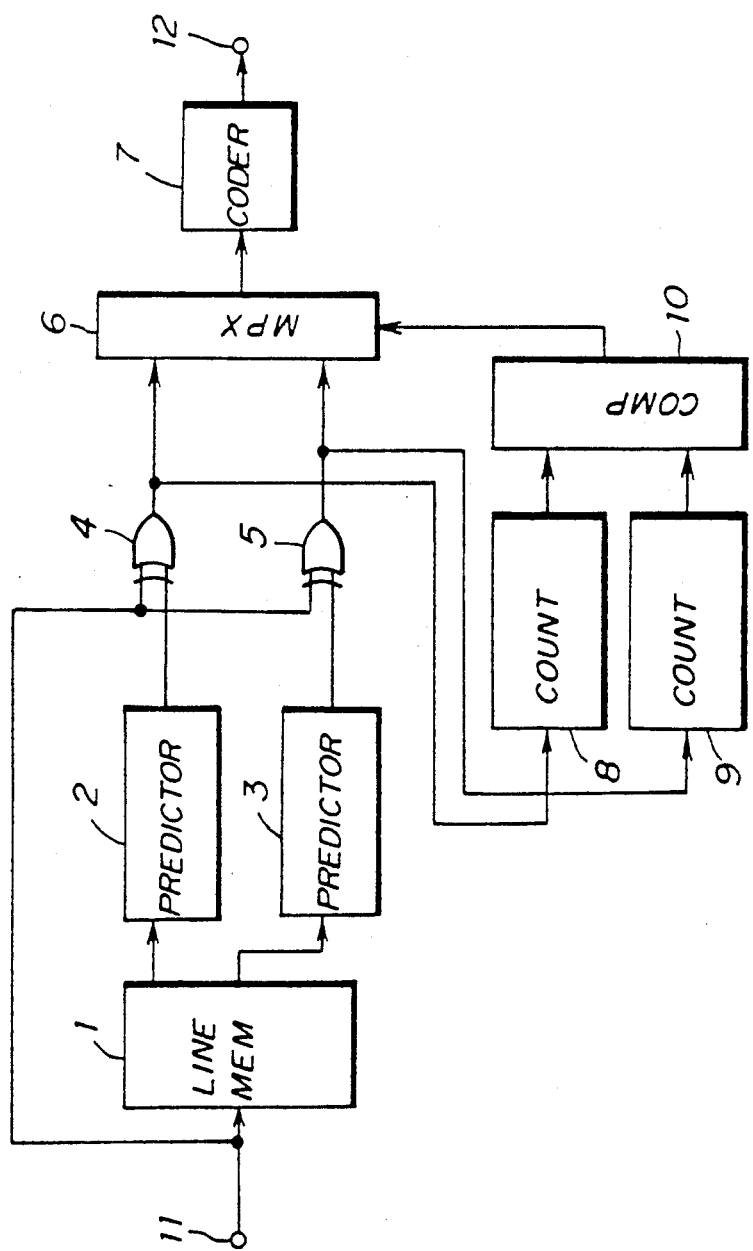
FIG.2 is a system block diagram showing an example of a conventional data compression system.

First, a description will be given of an operating principle of a halftone image data compression apparatus according to the present invention, by referring to FIG.3. The halftone image data compression apparatus includes image data storage means 21, halftone image input means 22, continuous state detecting means 23, counter means 24, and universal coding means 25 which are connected as shown.

The image data storage means 21 successively stores black/white pattern information related to pixels which are located at the same pixel position in n adjacent lines which are read from the halftone image. The image data storage means 21 includes n data storage units 31-1 through 31-$n$. A data storage unit 31-$i$ successively stores the black/white pattern information related to the pixel on an ith line, where $i = 1, 2, \ldots, n$.

The halftone image input means 22 successively inputs to the image data storage means 21 the image data of the halftone image in units of n lines which are to be processed.

The continuous state detecting means 23 detects whether or not the black/white pattern information related to the pixel which is stored in the image data storage means 21 matches the black/white pattern information related to the pixel which will be stored in the image data storage means 21 during a next storage cycle, for each of the n lines. The continuous state detecting means 23 includes n continuous state detectors 40-1 through 40-$n$. A continuous stage detector 40-$i$ detects whether or not the black/white pattern information related to the pixel which is stored in the data storage 31-$i$ of the image data storage means 21 matches the black/white pattern information related to the pixel which will be stored in the data storage 31-$i$ during a next storage cycle, for the ith line. The continuous state detecting means 23 also includes a continuous state detector 41 for detecting whether or not all of the n continuous state detectors 40-1 through 40-$n$ detects the matched state. In other words, the continuous state detector 41 detects whether or not the black/white pattern information related to the pixel which is stored in the data storage 31-$i$ of the image data storage means 21 matches the black/white pattern information related to the pixel which will be stored in the data storage 31-$i$ during a next storage cycle for all values of i ($i = 1, 2, \ldots, n$), that is, for all n lines. When the continuous state detector 41 detects that the black/white pattern information related to the pixel which is stored in the data storage 31-$i$ of the image data storage means 21 matches the black/white pattern information related to the pixel which will be stored in the data storage 31-$i$ during the next storage cycle for all values of i ($i = 1, 2, \ldots, n$), that is, for all n lines, it is judged that the black/white pattern information is continuous in the direction of the lines and the continuous state detector 41 outputs a first signal. On the other hand, when the continuous state detector 41 detects that the black/white pattern information related to the pixel which is stored in the data storage 31-$i$ of the image data storage means 21 does not match the black/white pattern information related to the pixel which will be stored in the data storage 31-$i$ during the next storage cycle for at least one value of i ($i = 1, 2, \ldots, n$), that is, for at least one of n lines, it is judged that the black/white pattern information which was continuous in the direction of the lines is discontinuous and the continuous black/white pattern information no longer exists. In this case, the continuous state detector 41 outputs a second signal. Therefore, the continuous state detector 41 operates so as to detect the periodic nature of the two-dimensional pattern information included in the halftone image.

The counter means 24 counts the number of matched states detected by the continuous state detector 41 in response to the first and second signals so as to count the number of pixels in the direction of the lines satisfying the matched state. In other words, the counter means 24 detects the run length of the pixels in the direction of the lines satisfying the matched state. Hence, the counter means 24 counts up for each pixel in the direction of the lines when the same pattern information continues and the continuous state detector 41 outputs the first signal. On the other hand, the counter means 24 is cleared in response to the second signal output from the continuous state detector 41 when the continuous state detector 41 detects a change in the pattern information.

A counted value output from the counter means 24 is supplied to the universal coding means 25 which also receives the corresponding black/white pattern information from the image data storage means 21. The counted value and the corresponding black/white pattern information form a processing unit. The second signal is also supplied to the universal coding means 25 as a data read instruction signal. Responsive to the second signal, the universal coding means 25 codes the time-sequential data in the processing units in conformance with a universal coding.

According to the halftone image data compression apparatus of the present invention, the universal coding is used to carry out the coding process appropriate for the various halftone images having various screen dot periods. In carrying out the coding process, the two-dimensional periodic nature of the halftone image is extracted and coded in conformance with the universal coding. Therefore, it is possible to considerably improve the data compression ratio of the halftone image.

Figure 4:
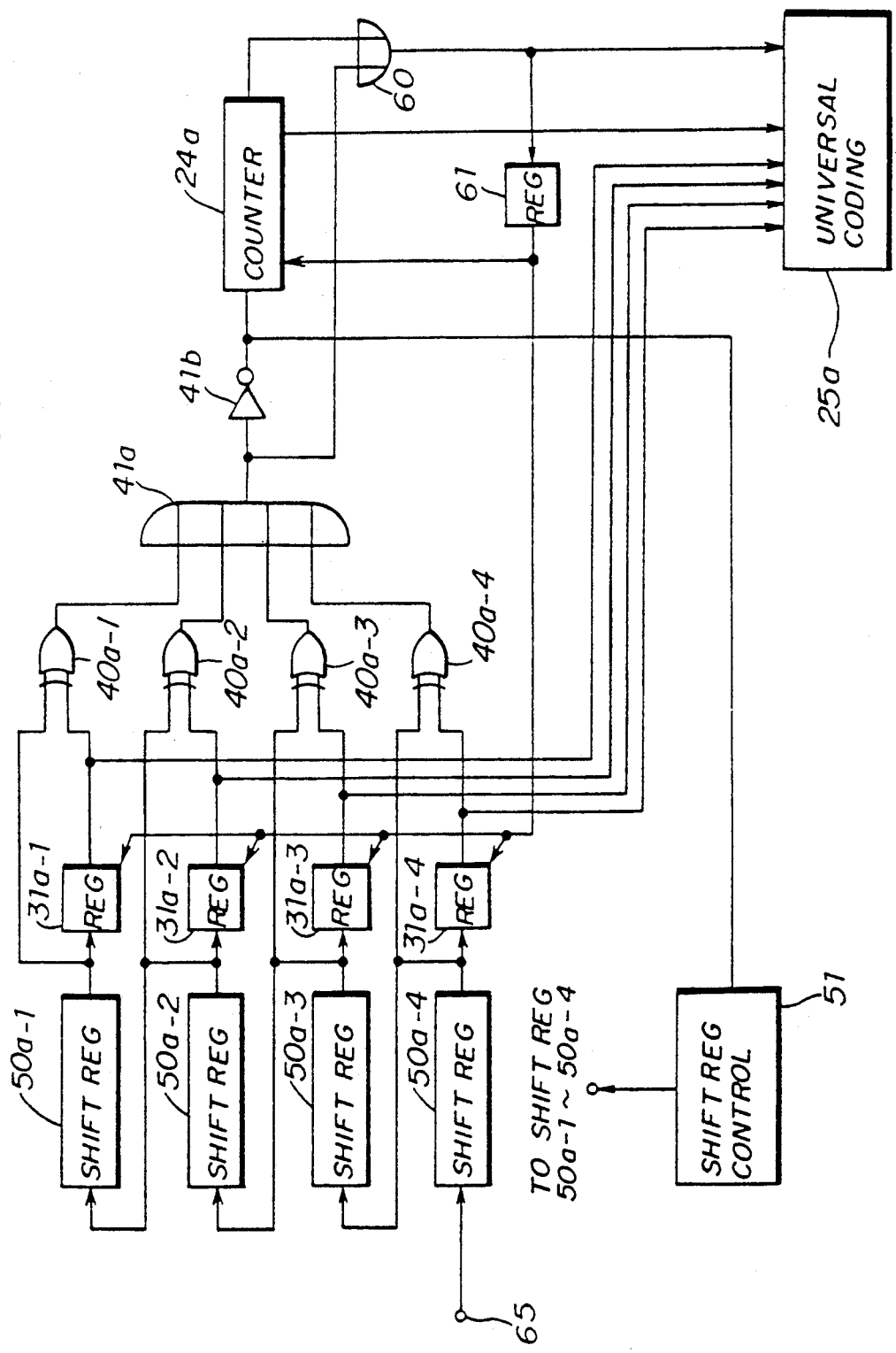
FIG.4 is a system block diagram showing an embodiment of the halftone image data compression apparatus according to the present invention.

Next, a description will be given of a first embodiment of the halftone image data compression apparatus according to the present invention, by referring to FIG.4. The halftone image data compression apparatus includes registers 31a-1 through 31a-4, shift registers 50a-1 through 50a-4, a shift register control circuit 51, exclusive-OR circuits 40a-1 through 40a-4, a first OR circuit 41a, an inverter 41b, a counter circuit 24a, a universal coding part 25a, a second OR circuit 60, and a register 61 which are connected as shown.

Figure 3:
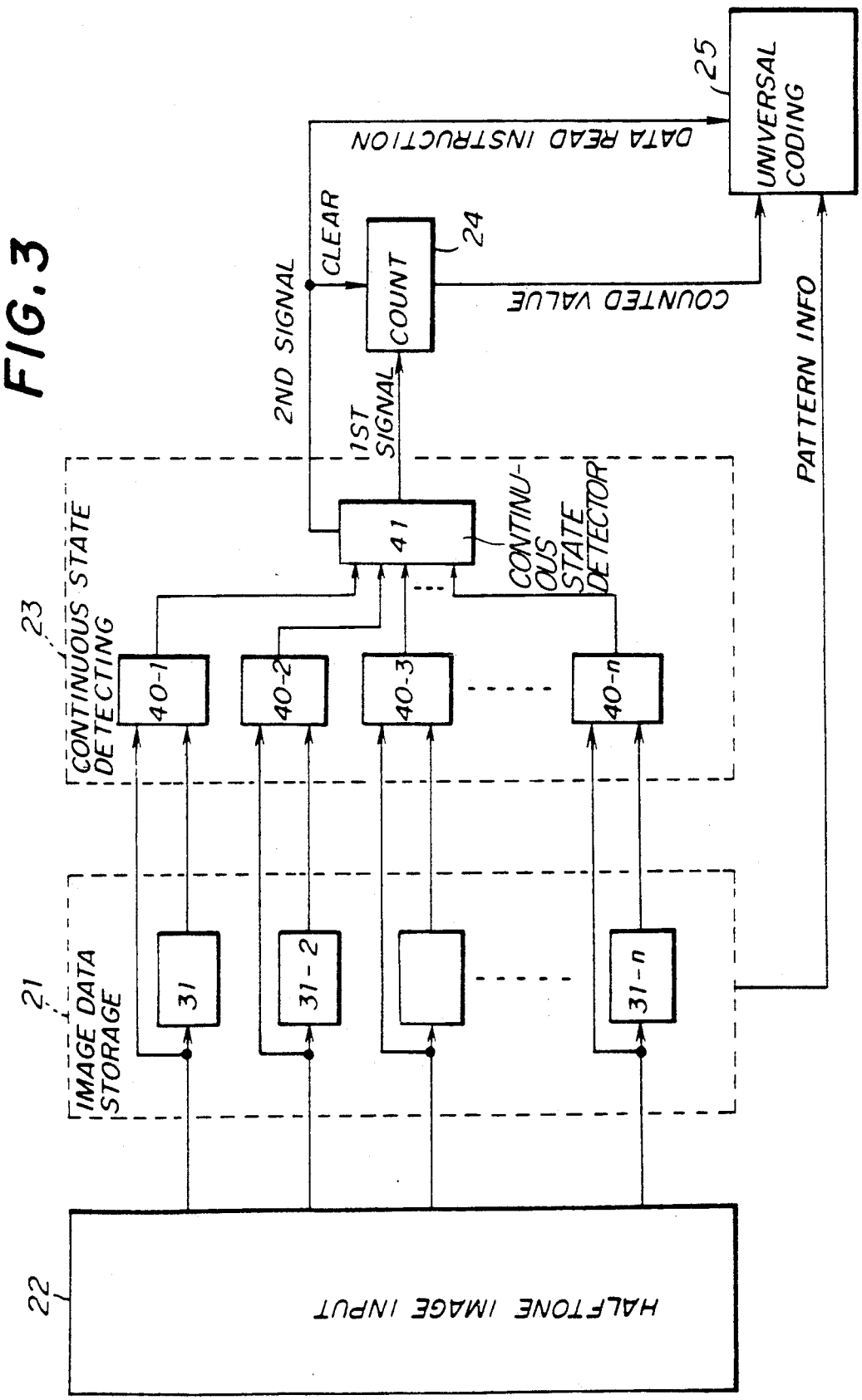
FIG.3 is a system block diagram for explaining an operating principle of a halftone image data compression apparatus according to the present invention.

The counter circuit 24a corresponds to the counter means 24 shown in FIG.3. The universal coding part 25a corresponds to the universal coding means 25. The register 31a-i corresponds to the data storage 31-i which is provided for the ith line. The shift register 31a-i stores the black/white pattern information related to the pixel which is located at the same pixel position for the four adjacent lines which are read from the halftone image, where i=1, 2, 3 and 4. The shift register 50a-i stores the black/white pattern information of the pixels for the ith line out of the four adjacent lines which are read from the halftone image, where i=1, 2, 3 and 4. The shift register control circuit 51 controls the shift operation of the shift registers 50a-1 through 50a-4. The shift registers 50a-1 through 50a-4 and the shift register control circuit 51 correspond to the halftone image input means 22.

The exclusive-OR circuit 40a-i outputs a signal "0" when the black/white pattern information of the pixel stored in the register 31a-i matches the black/white pattern information of the head pixel stored in the shift register 50a-i. The first OR circuit 41a outputs a signal "1" when at least one of the exclusive-OR circuits 40a-1 through 40a-4 outputs a signal "1". The inverter 41b inverts the output signal of the first OR circuit 41a and supplies the inverted signal to the counter 24a. Hence, the inverter 41b outputs a signal "1" when the signal "0" is output from all of the exclusive-OR circuits 40a-1 through 40a-4.

The second OR circuit 60 outputs a signal "1" when the counter circuit 24a outputs a carry signal and also when the first OR circuit 41b outputs a signal "1". The output signal "1" of the second OR circuit 60 instructs the universal coding part 25a to carry out a data read process of a coding process. The register 61 delays the output signal "1" of the second OR circuit 60 by one clock cycle. This register 61 supplies to the counter circuit 24a an instruction signal for clearing the counted value of the counter circuit 24a in response to the output signal "1" of the second OR circuit 60, and also supplies to the register 31a-i an instruction signal for latching the black/white pattern information of the pixel which is located at the head position of the ith line stored in the shift register 31a-i, where i=1, 2, 3 and 4.

Figure 5:
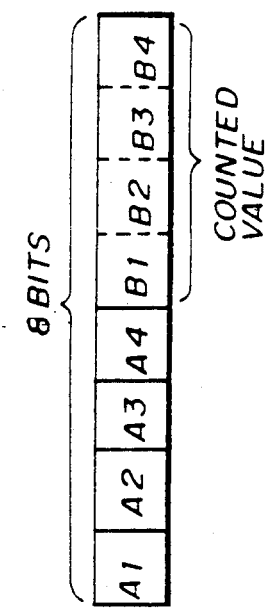
FIG.5 shows an embodiment of data processed by a universal coding part shown in FIG.4.

The universal coding part 25a reads the counted value in the counter circuit 24a and the black/white pattern information which is latched in the register 31a-i when the second OR circuit 60 outputs the signal "1", and treats the read information as one word. The universal coding part 25a codes the time-sequential data in conformance with a universal coding such as the Ziv-Lempel universal algorithm and the Ziv-Lempel incremental parsing algorithm. FIG.5 shows an embodiment of one word of which is read by the universal coding part 25a for a case where one word is made up of 8 bits. In FIG.5, A1 through A4 respectively correspond to the outputs of the registers 31a-1 through 31a-4, and B1 through B4 correspond to the counted value in the counter circuit 24a.

Next, a description will be given of the Ziv-Lempel universal algorithm and the Ziv-Lempel incremental parsing algorithm which are carried out in the universal coding part 25a. For example, the Ziv-Lempel universal algorithm and the Ziv-Lempel incremental parsing algorithm are described in Seiji Munakata, "Ziv-Lempel Data Compression Algorithms", Information Processing, Vol.26, No.1, 1985.

Figure 6:
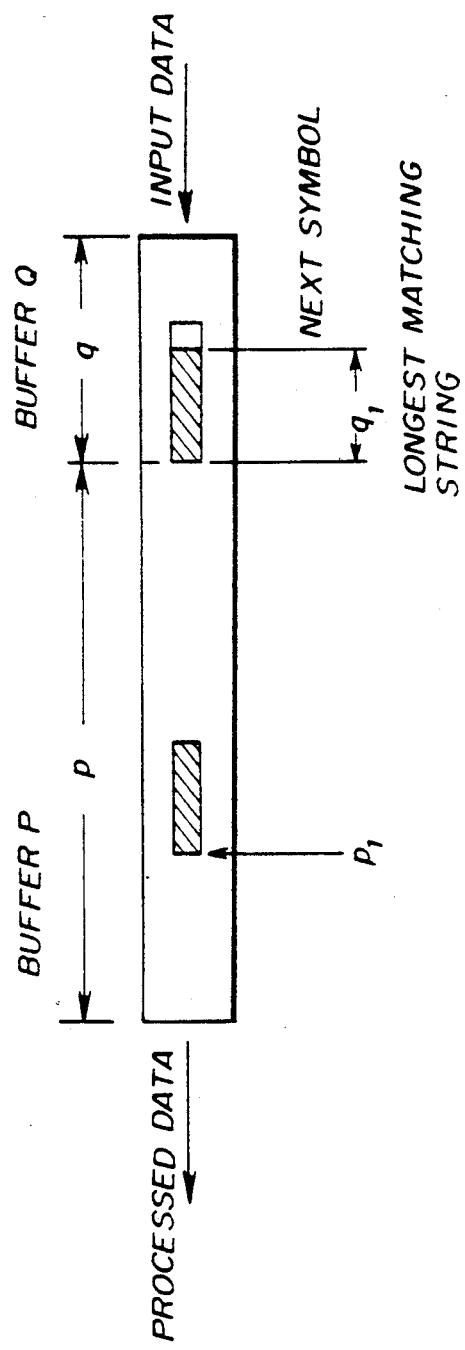
FIG.6 is a diagram for explaining the algorithm of the universal coding.

According to the Ziv-Lempel universal algorithm, the data is segmented into longest matching strings having a maximum length from an arbitrary position of a past data string, so as to code the data as a duplicate of the past string. In other words, as shown in FIG.6, there are provided a buffer P for storing the coded input data and a buffer Q for storing the data to be coded. The data string q in the buffer Q is collated with all of partial strings of the data string p in the buffer P so as to obtain a longest partial string q1 within the buffer P. In order to designate the longest partial string q1 within the buffer P, a set including the "starting position p1 of the longest partial string q1", the "matching length (number of words in this case)" and the "next symbol which causes a non-matching state (the data of the next word in this case)" is coded. Then, the coded data string within the buffer Q is transferred into the buffer P, and a new data string amounting to the coded data string is input into the buffer Q. The above described process is repeated so that the coding progresses while segmenting the data into partial strings.

As a modification of this Ziv-Lempel universal algorithm, there is the modified version of the Ziv-Lempel algorithm suggested by Storer and Szymanski (hereinafter simply referred to as LZSS coding) proposed in T. C. Bell, "Better OPM/L Text Compression", IEEE Transactions on Communications, Vol.COM-34, No.12, December 1986. According to the LZSS coding, a flag is provided to distinguish a coded code and raw data, and the raw data is coded when the coded code becomes longer than the raw data.

While to the Ziv-Lempel universal algorithm can obtain a high data compression ratio, it suffers from a problem in that the number of required operations is large. Hence, the Ziv-Lempel incremental parsing algorithm was proposed to overcome this problem of the Ziv-Lempel universal algorithm. According to the Ziv-Lempel incremental parsing algorithm, the input data string is subjected to an incremental parsing and coded.

When the input data string is x = aabababaa . . . . the Ziv-Lempel incremental parsing algorithm makes an incremental parsing as x = a·ab·aba·b·aa· . . . according to the longest string excluding the right end symbol of a redundant component which has already occurred and is already encoded. Each component string which is obtained by the incremental parsing is described by the "index of the order with which the component occurred" and the "next symbol (data of the next word in this case)" and coded according to the redundant component string. In the above described case, the input data string x is parsed into a redundant string X which is described by $X = X_0X_1X_2X_3X_4X_5 \ldots$, where $X_0 = \lambda$, $X_1 = X_0a$, $X_2 = X_1b$, $X_3 = X_2a$, $X_4 = X_0b$, $X_5 = X_O$ and $\lambda$ denotes an empty string.

A modified version of the Ziv-Lempel algorithm suggested by Welch (hereinafter simply referred to as LZW coding) is proposed in T. A. Welch, "A Technique for High-Performance Data Compression", Computer, June 1984 as a modification of the Ziv-Lempel incremental parsing algorithm. According to the LZW coding, the coding is carried out with the index alone by inserting the next symbol in the next partial string.

According to the universal codings described above, the data to be processed is segmented and described by the redundant component. For this reason, when applied to the data compression of the halftone image data, it is possible to carry out the processing while at the same time learning and extracting the period information of the halftone images.

But although the halftone image has as the pattern information a two-dimensional periodic nature, the universal coding itself only takes into account the one-dimensional strings. For this reason, there is still room for improving the data compression ratio. According to the present invention, a preprocessing enables considerable improvement of the data compression ratio for the case where the universal coding is employed, because the two-dimensional periodic nature of the halftone image is extracted and used as the processing data for carrying out the universal coding.

Next, a description will be given of the operation of the first embodiment shown in FIG.4. The shift register control circuit 51 carries out a control so that the image data (black/white pattern information of each pixel) amounting to four adjacent lines are read out from a halftone image data file (not shown) and supplied to the shift register 50a-4 via an input terminal 65. The read image data are successively shifted in units of one line and stored in the shift registers 50a-4 through 50a-1. When the storage of the image data amounting to four lines into the shift registers 50a-1 through 50a-4 is completed, the shift register control circuit 51 carries out a read operation to read out from the shift register 50a-i the black/white pattern information of the pixel located at the head position, stores this information into the corresponding register 31a-i, and shifts the data stored in the shift register 50a-i by one bit in synchronism with this read operation for i = 1, 2, 3 and 4. The above described process is carried out every time the coding process is made for four lines of the halftone image stored in the previous process cycle.

The exclusive-OR circuit 40a-i judges whether or not the black/white pattern information stored in the register 31a-i matches the black/white pattern information stored at the head position of the shift register 50a-i. A signal "0" is output from the exclusive-OR circuit 40a-i when the two information match. In other words, the exclusive-OR circuit 40a-i outputs the signal "0" when two successive pixels on the ith line have the same black/white pattern information. The first OR circuit 41a outputs a signal "0" when the signal "0" is output from all of the exclusive-OR circuits 40a-1 through 40a-4, that is, when the pixels on the four adjacent lines have the same black/white pattern information. On the other hand, when at least one of the exclusive-OR circuits 40a-1 through 40a-4 outputs a signal "1", that is, when the pixels on the four adjacent lines no longer have the same black/white pattern information, the first OR circuit 41a outputs a signal "1".

When the first OR circuit 41a outputs the signal "0", the inverter 41b supplies a signal "1" to the counter circuit 24a. The counter circuit 24a increments the counted value by one in response to the signal "1" received from the inverter 41b. When the inverter 41b outputs the signal "1", the shift register control circuit 51 shifts the stored data in the shift register 50a-i by one bit towards the head position for i = 1, 2, 3 and 4. By this shift process, the black/white pattern information which is stored at the head position of the shift register 50a-i for comparison with the black/white pattern information stored in the register 31a-i is renewed by the black/white pattern information of the next pixel.

The counting operation of the counter circuit 24a continues until the counted value exceeds a maximum count and a carry signal is generated, or until the output signal of the first OR circuit 41a changes to "1". When the carry signal is output from the counter circuit 24a and when the signal "1" is output from the first OR circuit 41a, the second OR circuit 60 outputs a signal "1" so as to instruct the universal coding part 25a to carry out the data read process of a coding process.

When the universal coding part 25a receives the data read instruction signal from the second OR circuit 60, the universal coding part 25a reads the counted value of the counter circuit 24a and the black/white pattern information which is latched in the register 31a-i as the data to be processed by the universal coding as described above in conjunction with FIG.5, for i = 1, 2, 3 and 4.

Figure 7:
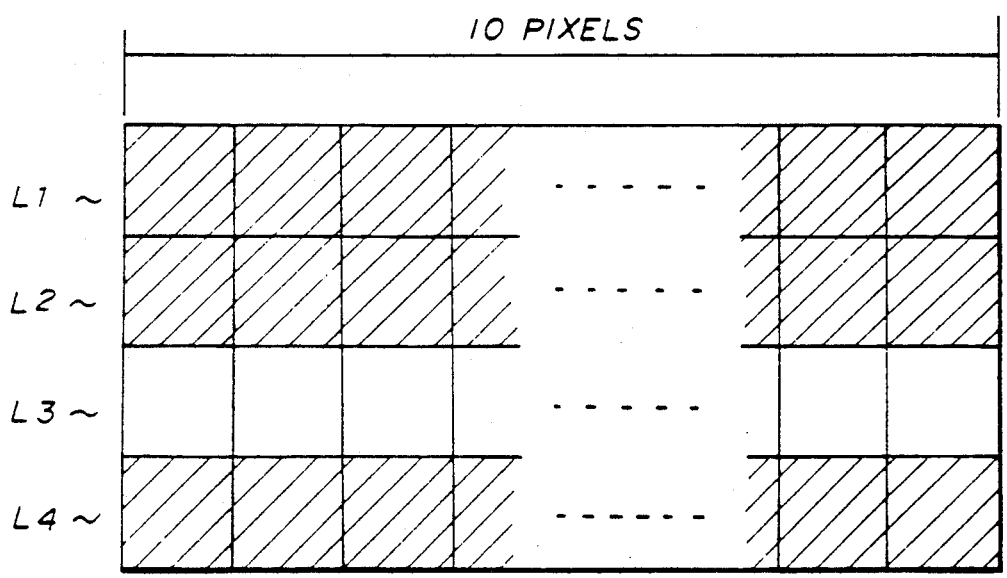
FIG.7 shows black/white pattern information of pixels on four adjacent lines for a case where each line has ten pixels.
Figure 8:
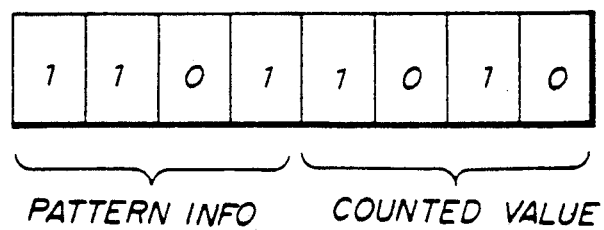
FIG.8 shows data which is to be processed by the universal coding.

FIGS.7 and 8 are diagrams for explaining the data to be processed by the universal coding. FIG.7 shows the black/white pattern information of the pixels on the four adjacent lines for the case where each line has ten pixels. In FIG.7, the black pattern information is indicated by a hatching. In addition, L1 through L4 respectively denote the lines which are successively stored in the registers 31a-1 through 31a-4. On the other hand, FIG.8 shows the data which is to be processed by the universal coding, where "PATTERN INFO" denotes the black/white pattern information and "COUNTED VALUE" denotes the counted value of the counter circuit 24a.

When the second OR circuit 60 outputs a signal "1", the counted value of the counter circuit 24a is cleared via the register 61. In addition, the black/white pattern information of the pixel at the head position in the shift register 50a-i is latched in the register 31a-i, for i=1, 2, 3 and 4. As a result, a next counting process is started to obtain the next run of the same black/white pattern information.

Therefore, the data which reflects the two-dimensional periodic nature of the pattern information of the halftone image is time-sequentially supplied to the universal coding part 25a. Hence, the universal coding part 25a codes the time-sequential data of the halftone image with a high efficiency in conformance with a universal coding such as the Ziv-Lempel universal algorithm and the Ziv-Lempel incremental parsing algorithm.

Of course, the universal coding is not limited to those described above, and the present invention is applicable to other universal coding.

Next, a more detailed description will be given of the LZSS coding and the LZW coding.

A lookahead buffer Q shown in FIG.9A and a buffer P shown in FIG.9B are used when carrying out the LZSS coding. The buffer Q stores the character string to be coded using a 4-bit reference number information, and 16 characters can be stored in correspondence with the 4-bit reference numbers. On the other hand, the buffer P stores the coded character string using a 12-bit reference number information, and 4096 character strings can be stored in correspondence with the 12-bit reference number.

As shown in FIG.10, the character string in the buffer Q and the character strings in the buffer P are collated so as to obtain a longest matching character string. The obtained character partial string is designated by the "starting position in the buffer P where the character partial string starts" and the "length of the character partial string". In addition, when the character string is 2 bytes or less, raw data is coded because it is more efficient to code the raw data in this case. The codes of the character string or the raw data are collected in eights as shown in FIG.10, and an 8-bit identification data is added to the head to indicate whether the data relates to the codes of the character string or the raw data before the data is output as a code. Next, the coded character string in the buffer Q is transferred into the buffer P, and a new character string amounting to the coded character string is input into the buffer Q. In FIG.10, the coded data is denoted by "0" and the raw data is denoted by "1" in the lower left part thereof.

Figure 11:
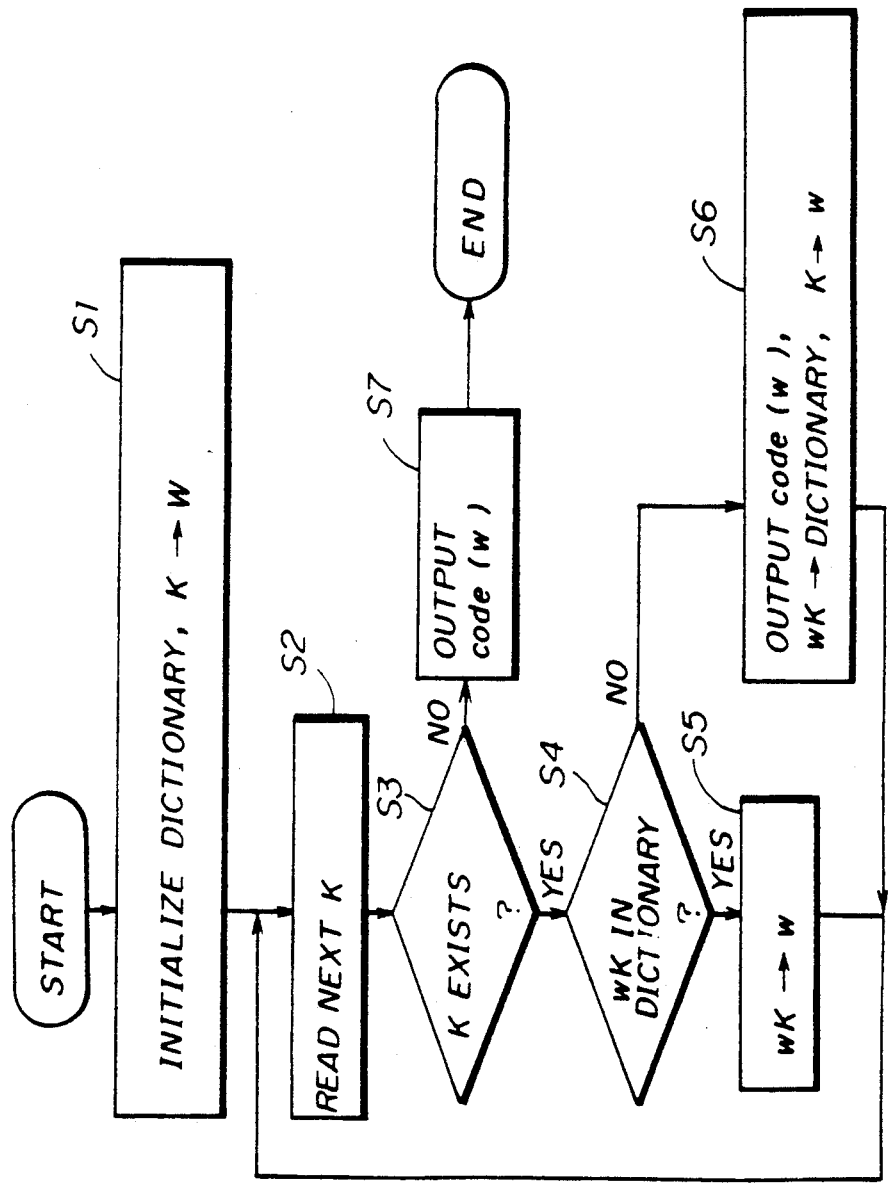
FIG.11 is a flow chart for explaining a coding process in conformance with the LZW coding.
Figure 12:
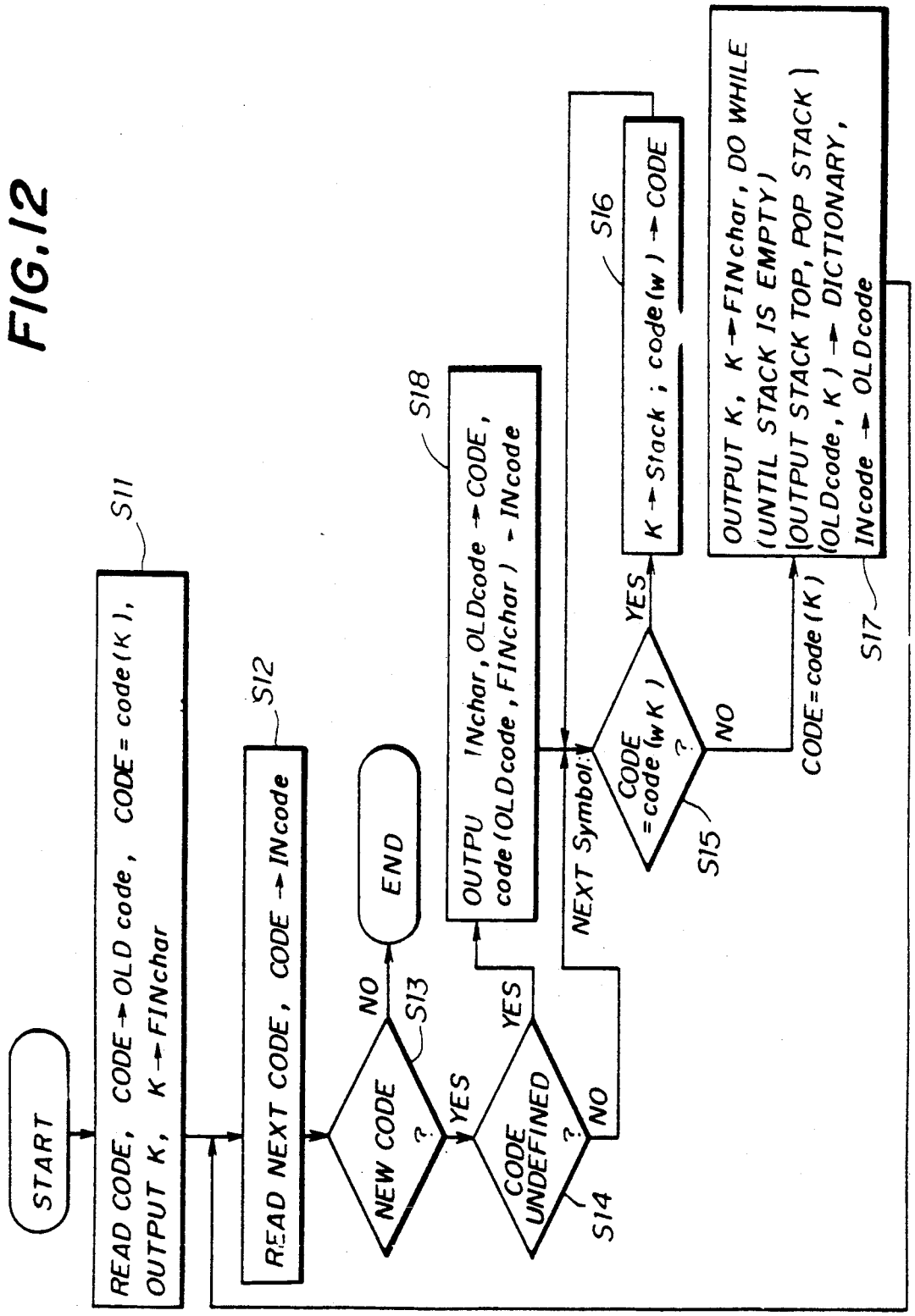
FIG.12 is a flow chart for explaining a decoding process in conformance with the LZW coding.

Next, a description will be given of the LZW coding. FIGS.11 and 12 respectively show coding and decoding algorithms of the LZW coding. The LZW coding uses a rewritable dictionary, and the input character code data are divided into mutually different character strings. The character strings are numbered depending on the appearing order and registered in the dictionary. In addition, the character string which is presently input is described only by the number of the longest matching character string registered in the dictionary and coded.

FIGS.13 through 15 are diagrams for explaining the LZW coding for a simple case where the data to be compressed and expanded is made solely of a combination of three characters "a", "b" and "c".

In FIG.11, when the coding process starts, a step S1 registers in the dictionary character strings made up of one character as initial values for all characters. In addition, the step S1 collates a first character K of the input data with the registered characters in the dictionary so as to obtain a corresponding reference number w. This reference number is regarded as a prefix string. Then, a step S2 reads a next character K of the input data, and a step S3 judges whether or not the next character K exists. When the judgement result in the step S3 is YES, a step S4 judges whether or not the dictionary contains wK which is the prefix string w obtained in the step S1 added with the character K read in the step S2.

When the judgement result in the step S4 is YES, a step S5 replaces the character string wK by the reference number w and the process returns to the step S2 so as to search for the longest matching character string until no other character string wK is found in the dictionary.

On the other hand, when the judgement result in the step S4 is NO, a step S6 outputs the reference number w of the character K obtained in the step S1 as a code code(w), and adds a new reference number to the character string wK and registers the same in the dictionary. In addition, the step S6 replaces the character K obtained in the step S2 by the reference number w and increments a dictionary address n by one. Thereafter, the process returns to the step S2 to read the next character K.

When the input character string ends and the judgement result in the step S3 is NO, a step S7 outputs the code code(w) and the process ends.

In FIG.13, the input data (INPUT SYMBOLS) are read from left to right. When the first character is "a", the dictionary does not have a matching character string other than "a", and thus outputs the reference number "1" as the code (OUTPUT CODE). Then, a reference number "4" is assigned to an extended character string "ab" and registered in the dictionary as shown in FIG.14. The actual registration is made in the form of a character string "1b" as shown in FIG.14. The dictionary contains no matching character string other than "b", and for this reason, the reference number "2" is output as the code. The extended character string "ba" is assigned a reference number "5" and is actually registered in the form of a character string "2a" as shown in FIG.14. The third "a" becomes the head of the next character string, and the above described process is continued similarly thereafter.

In FIG.12, when the decoding process starts, a step S11 reads the first code CODE, that is the first reference number. This first (present) code CODE is regarded as OLDcode. The first code CODE matches the reference number of one character which is already registered in the dictionary. Hence, a character code(K) which matches the first code CODE is obtained from the dictionary and the character K is output. The output character K is set in FINchar for a later exception process.

A step S12 reads the next code CODE and sets this next code CODE as INcode. A step S13 judges whether or not a new (next) code exists. When the judgement result in the step S13 is YES, a step S14 judges whether or not the code CODE input in the step S13 is undefined (not registered) in the dictionary. On the other hand, when the input code ends and the judgement result in the step S13 is NO, the process ends.

Normally, the input code is registered in the dictionary by the operations up to the previous process, and the judgement result in the step S14 is NO. In this case, a step S15 reads from the dictionary the character string code(wK) which corresponds to the code CODE, and judges whether or not CODE =code(wK). When the judgement result in the step S15 is YES, a step S16 temporarily stacks the character string K, and the reference number code(w) is regarded as a new CODE before the process returns to the step S15. The steps S15 and S16 are repeated until the reference number w becomes one character.

On the other hand, when the judgement result in the step S15 is NO, a step S17 outputs the stacked character string in a last-in-last-out (LILO) order. At the same time, the previously used code w and the first character K of the character string which is restored by the present process are regarded as a set (w, K), and a new reference number is added to the character string described by (w, K) before being registered in the dictionary. The process returns to the step S12 after the step S17.

A step S18 is carried out when the judgement result in the step S14 is YES. The step S18 outputs FINchar, sets OLDcode as CODE and sets code(OLDcode, FINchar) as INcode. This step S18 corresponds to an exception process which will be described later.

In FIG.15, the first input code is "1". The characters "a", "b" and "c" respectively are already assigned the reference numbers "1", "2" and "3" and registered in the dictionary as shown in FIG.14. Hence, the reference number which matches the code "1" is found by referring to the dictionary and this reference number is replaced by the corresponding character string "a" and output. With regard to the next input code "2", the matching reference number is similarly replaced by the character string "b" and output. A new reference number "4" is added to a combination "1b" of the previously processed code and the first character "b" which is decoded by the present process before registration in the dictionary. For the third code "4,""1b" is replaced by "ab" by referring to the dictionary and the character string "ab" is output. At the same time, a new reference number "5" is added to a combination "2a (=ba)" of the previously processed code "2" and the first character "a" of the character string which is decoded by the present process before registration in the dictionary. The above described process is repeated thereafter.

An exception process is required when carrying out the decoding process as shown in FIG.15. This exception process is carried out when decoding the sixth input code "8". The code "8" is undefined in the dictionary when decoding this code "8", and the decoding cannot be made. In this case, a character string "5b" is obtained. This character string "5b" is obtained by adding to the previously decoded code "5" the first character "b" of the character string "ba" which is decoded by the present process. In addition, the character string "5b" is replaced by "2ab, bab" and output. Furthermore, a reference number "8" is added to the character string "5b" before being registered in the dictionary.

Next, a description will be given of an embodiment of the universal coding part 25a shown in FIG.4, by referring to FIG.16. The universal coding part 25a shown in FIG.16 includes a controller 81, a pattern matching part 82, a memory 83 and a variable length coder 84 which are connected as shown. The controller 81 receives the output signal of the second OR circuit 60 via an input terminal 85, and controls the pattern matching part 82 responsive to this output signal of the second OR circuit 60. The pattern matching part 82 receives the data from the counter 24a and the registers 31a-1 through 31a-4 via an input terminal 86. The memory 83 stores the dictionary.

The pattern matching part 82 collates the incoming data from the input terminal 86 with the data contained in the dictionary and finds a matching character string. The variable length coder 84 codes the output data of the pattern matching part 82 in conformance with the variable length coding, and outputs the coded data via an output terminal 87.

In a best mode of the present invention, the universal coding part 25a carries out the universal coding in conformance with the LZW coding described above. When the LZW coding is employed in the present invention, an extremely high compression ratio can be obtained. In this case, the pattern matching part 82 carries out the steps S1 through S6 shown in FIG.11, and the variable length coder 84 carries out the steps S6 and S7 shown in FIG.11.

Further, the present invention is not limited to these embodiments, but various variations can be made without departing from the scope of the present invention.

What is claimed is:

1. A halftone image data compression apparatus for processing a halftone image, comprising:
   first means for detecting a continuous state of pattern data of two successive pixels on a line of a halftone image for N adjacent lines of the halftone image, where N is an integer;
   second means, coupled to said first means, for detecting run lengths of the continuous state detected in said first means along a direction of the lines; and
   third means, coupled to said first and second means, for subjecting to a universal coding time-sequential data which is in predetermined processing units, each of the predetermined processing units being made up of one of the run lengths which is detected by said second means and corresponding pattern data which are received from said first means while the continuous state is detected for said one run length.

2. The halftone image data compression apparatus as claimed in claim 1, wherein said first means includes:
   halftone image input means for storing pattern data of the halftone image;
   image data storage means, coupled to said halftone image input means, for successively reading the pattern data from said halftone image input means and storing the pattern data of pixels located at a corresponding position on each of N lines of the halftone image; and
   continuous state detecting means, coupled to said image data storage means, for detecting the continuous state when the pattern data stored in said image data storage means during an arbitrary storage cycle match the pattern data read from said halftone image input means and stored in said image data storage means during a storage cycle immediately subsequent to said arbitrary storage cycle, said continuous state detecting means outputting a detection signal indicative of whether or not the continuous state is detected.

3. The halftone image data compression apparatus as claimed in claim 2, wherein said image data storage means includes N registers, and wherein each of said N registers stores the pattern data of one of the pixels on a corresponding one of N lines of the halftone image data.

4. The halftone image data compression apparatus as claimed in claim 2, wherein said continuous state detecting means includes:

N exclusive-OR circuits; and an OR circuit, coupled to said N exclusive-OR circuits, supplied with outputs of said N exclusive-OR circuits, each of said N exclusive-OR circuits being supplied with the pattern data stored in said image data storage means during said arbitrary storage cycle and the pattern data read from said halftone image input means and stored in said image data storage means during said storage cycle immediately subsequent to said arbitrary storage cycle, said OR circuit outputting said detection signal.

5. The halftone image data compression apparatus as claimed in claim 2, wherein said second means includes a counter for counting a number of times the output detection signal of said continuous state detecting means indicates the detection of the continuous state.

6. The halftone image data compression apparatus as claimed in claim 5, wherein said counter is cleared in response to the output detection signal of said continuous state detecting means indicating non-detection of the continuous state.

7. The halftone image data compression apparatus as claimed in claim 2, wherein said third means codes the time-sequential data in response to the output detection signal of said continuous state detecting means indicating non-detection of the continuous state.

8. The halftone image data compression apparatus as claimed in claim 1, wherein said third means includes universal coding means for coding the time-sequential data in conformance with a universal coding algorithm selected from a group consisting essentially of a Ziv-Lempel universal algorithm, a Ziv-Lempel incremental parsing algorithm, an LZSS coding Ziv-Lempel algorithm and an LZW coding modified version of the Ziv-Lempel algorithm.

9. The halftone image data compression apparatus as claimed in claim 1, wherein said third means includes universal coding means for coding the time-sequential data in conformance with an LZW coding modified version of a Ziv-Lempel algorithm.

10. A method of compressing halftone image data comprising the steps of:

(a) detecting a continuous state of pattern data of two successive pixels on a line of a halftone image for N adjacent lines of the halftone image, where N is an integer;

(b) detecting a run length of the continuous state which is detected in said step (a) along a direction of the lines; and (c) subjecting to a universal coding a time-sequential data which is in predetermined processing units, each of said predetermined processing units being made up of one run length which is detected in said step (b) and corresponding pattern data which are received while the continuous state is detected for said one run length.

11. The method of compressing halftone image data as claimed in claim 10, wherein said step (a) includes substeps of:

(a1) storing pattern data of the halftone image;

(a2) successively reading the stored pattern data of the halftone image and storing the pattern data of pixels located at the same position on each of N lines of the halftone image; and (a3) detecting the continuous state when the pattern data stored during an arbitrary storage cycle match the pattern data read and stored during a storage cycle immediately subsequent to the arbitrary storage cycle, said detecting subset (a3) including outputting a detection signal indicative of whether or not the continuous state is detected.

12. The method of compressing halftone image data as claimed in claim 11, wherein said step (b) includes counting a number of times the detection signal output by said detecting substep (a3) indicates the detection of the continuous state.

13. The method of compressing halftone image data as claimed in claim 12, further comprising a step of clearing a counted value in response to the detection signal indicating non-detection of the continuous state.

14. The method of compressing halftone image data as claimed in claim 11, wherein said step (c) includes coding the time-sequential data in response to the detection signal indicating non-detection of the continuous state.

15. The method of compressing halftone image data as claimed in claim 10, wherein said step (c) includes coding the time-sequential data in conformance with a universal coding algorithm selected from a group consisting essentially of a Ziv-Lempel universal algorithm, a Ziv-Lempel incremental parsing algorithm, an LZSS coding Ziv-Lempel algorithm and an LZW coding modified version of the Ziv-Lempel algorithm.

16. The method of compressing halftone image data as claimed in claim 10, wherein said step (c) includes coding the time-sequential data in conformance with an LZW coding modified version of a Ziv-Lempel algorithm.

* * * * *

UNITED STATES PATENT AND TRADEMARK OFFICE
CERTIFICATE OF CORRECTION

PATENT NO. : 5,177,622
DATED : JANUARY 5, 1993
INVENTOR(S) : SHIGERU YOSHIDA ET AL.

It is certified that error appears in the above-identified patent and that said Letters Patent is hereby corrected as shown below:

On the Title page, item [56], References Cited:

```
Before "4,623,325   12/1986   Usubuchi" insert
     --4,257,069    3/1981    Murayama et al.   358/261
       4,365,273   12/1982    Yamada et al.     358/260--.
```

FOREIGN PATENT DOCUMENTS

After line 1, insert the following:

```
--0309655    4/1989    Europe.
  0259588    3/1988    Europe.--.
```

Col. 7, line 6, "to" should be deleted.

Col. 14, line 23, "subset" should be --substep--.

Signed and Sealed this

Twenty-fifth Day of January, 1994

Attest:

BRUCE LEHMAN

*Attesting Officer*     *Commissioner of Patents and Trademarks*